(12) United States Patent
Hozumi et al.

(10) Patent No.: US 9,186,973 B2
(45) Date of Patent: Nov. 17, 2015

(54) CONNECTOR COMPONENT FOR AN AUTOMOTIVE EQUIPMENT SIDE AND A BATTERY SIDE

(75) Inventors: Mamoru Hozumi, Kariya-shi (JP); Yoshio Ojima, Kariya-shi (JP); Takahiro Fukagawa, Kariya-shi (JP); Takashi Murase, Kariya-shi (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 43 days.

(21) Appl. No.: 14/000,953

(22) PCT Filed: Mar. 13, 2012

(86) PCT No.: PCT/JP2012/056447
§ 371 (c)(1),
(2), (4) Date: Aug. 22, 2013

(87) PCT Pub. No.: WO2012/124700
PCT Pub. Date: Sep. 20, 2012

(65) Prior Publication Data
US 2014/0017936 A1  Jan. 16, 2014

(30) Foreign Application Priority Data

Mar. 16, 2011 (JP) ................................. 2011-058406

(51) Int. Cl.
*H01R 13/64* (2006.01)
*B60K 1/04* (2006.01)
*H01R 13/631* (2006.01)

(52) U.S. Cl.
CPC .............. *B60K 1/04* (2013.01); *H01R 13/6315* (2013.01); *B60K 2001/0438* (2013.01); *B60K 2001/0472* (2013.01)

(58) Field of Classification Search
CPC ........... H01R 13/5202; H01R 13/6315; H01R 13/631; B60K 1/04

USPC ................................. 439/527, 246, 247, 248
See application file for complete search history.

(56) References Cited

U.S. PATENT DOCUMENTS 4,909,748 A * 3/1990 Kozono et al. ................ 439/247
7,393,228 B2 * 7/2008 Kabasawa et al. ............ 439/247
(Continued)

FOREIGN PATENT DOCUMENTS

JP  63-127072 U    8/1987
JP  09259973 A   10/1997
(Continued)

OTHER PUBLICATIONS

Translation of the International Preliminary Report on Patentability issued for corresponding International Patent Application No. PCT/JP2012/056447 mailed Sep. 19, 2013.
(Continued)

*Primary Examiner* — Hae Moon Hyeon
(74) *Attorney, Agent, or Firm* — Sughrue Mion, PLLC

(57) ABSTRACT

Provided is a connector component that allows easily performing coupling of connectors with each other. In a connector component (a vehicle-side electrical connector) according to an embodiment of the present invention, a vehicle-side connector is mounted on a base bracket via mounting members formed of rubber, elastic deformation of the mounting members permits a relative positional displacement of the base bracket and the vehicle-side connector in a compressing direction (Z-direction) as well as a relative positional displacement in a sliding direction (a direction in an X-Y plane). Therefore, even when there is a positional displacement and/or inclination between the vehicle-side electrical connector and a battery-side electrical connector and a relative positional displacement in the sliding direction has occurred, self-correction is performed by elastic deformation of the mounting members. Thus, according to the vehicle-side electrical connector, coupling when coupling the battery-side electrical connector can be easily performed.

9 Claims, 14 Drawing Sheets

(56) References Cited

U.S. PATENT DOCUMENTS

| | | | |
|---|---|---|---|
| 7,713,076 B2* | 5/2010 | Arts et al. | 439/248 |
| 8,516,687 B2* | 8/2013 | Hozumi et al. | 29/729 |
| 8,585,421 B2* | 11/2013 | Yamaguchi et al. | 439/248 |
| 2008/0274634 A1 | 11/2008 | Kabasawa et al. | |
| 2008/0293277 A1* | 11/2008 | Kumar et al. | 439/247 |
| 2009/0137145 A1 | 5/2009 | Arts et al. | |
| 2010/0112843 A1 | 5/2010 | Heichal et al. | |

FOREIGN PATENT DOCUMENTS

| | | |
|---|---|---|
| JP | 2004-327169 A | 11/2004 |
| JP | 2007-179942 A | 7/2007 |
| JP | 2007-280913 A | 10/2007 |
| JP | 2009-295492 A | 12/2009 |
| JP | 2010-225488 A | 10/2010 |
| JP | 2010-272242 A | 12/2010 |
| JP | 2011-034935 A | 2/2011 |
| JP | 2011-098644 A | 5/2011 |
| JP | 2011-103259 A | 5/2011 |

OTHER PUBLICATIONS

International Search Report for corresponding International Patent Application No. PCT/JP2012/056447 mailed May 22, 2012.

Communication dated Apr. 21, 2015, issued by the State Intellectual Property Office of the People's Republic of China in counterpart Application No. 201280013060.6.

Communication dated Jul. 8, 2015, issued by the European Patent Office in counterpart Application No. 12757092.7.

* cited by examiner

CONNECTOR COMPONENT FOR AN AUTOMOTIVE EQUIPMENT SIDE AND A BATTERY SIDE

CROSS REFERENCE TO RELATED APPLICATIONS

This application is a National Stage of International Application No. PCT/JP2012/056447 filed Mar. 13, 2012, claiming priority based on Japanese Patent Application No. 2011-058406 filed Mar. 16, 2011, the contents of all of which are incorporated herein by reference in their entirety.

TECHNICAL FIELD

The present invention relates to a connector component including a connector that composes a connector pair on an automotive equipment side and a battery side for mounting a battery in an automobile.

BACKGROUND ART

Recently, in the field of electric vehicles, research on removable traveling batteries has advanced. When mounting such a battery in a vehicle, simultaneously therewith, a battery-side connector and a connector on the side of electrical equipment mounted in the automobile are coupled. In that case of coupling, a relative positional displacement and/or inclination between the connectors may occur, and it is preferable that the connector component itself has a function of self-correcting these. The following Patent Literature 1 discloses an art, to be used for an automotive sliding door, in which connectors self-correct their positions with respect to each other when being coupled.

For example, in the connector component 300 shown in FIG. 7, a base bracket 310 to be fixed to a vehicle body and a support plate 320 that supports an automotive equipment-side connector terminal C1 have a configuration to allow permitting, by a compressive reaction force of coil springs 330 disposed at four corners of the connector terminals C1 and wound around fixed shafts 322 that penetrate through the support plate 320, a relative positional displacement in a compressing direction (the Z-direction in the figure) to some extent.

CITATION LIST

Patent Literature

Patent Literature 1: Japanese Patent Application Laid-Open No. 2007-179942

SUMMARY OF INVENTION

Technical Problem

However, the connector component 300 described above does not have a function of permitting a relative positional displacement in a sliding direction (a direction in an X-Y plane of the figure) between the base bracket 310 and the support plate 320. Therefore, in such a case of relative positional displacement, a coil spring deflection and a sliding movement between the coil spring 330 and the support plate 320 (or a sliding movement between these and a washer 332) occurs, and it is considered that contact between the constituent members such as metal components can cause the occurrence of wear and noise of the members. Further, a situation that metal powder caused by wear enters into a connector is also likely to occur.

The present invention has been made to solve the foregoing problems, and an object thereof is to provide a connector component that allows easily performing coupling of connectors with each other.

Solution to Problem

A connector component according to the present invention is a connector component including a connector that composes a connector pair on an automotive equipment side and a battery side for mounting a battery in an automobile, further including a base bracket to be fixed to a vehicle body or the battery, and a mounting member formed of an elastic material, for causing the connector to be mounted in a state spaced at a predetermined interval with respect to the base bracket, in which the connector and the base bracket are integrally constructed via the mounting member.

In such a connector component, because the base bracket is mounted with the connector via the mounting member formed of an elastic material, elastic deformation of the mounting member permits a relative positional displacement of the base bracket and connector not only in a compressing direction but also in a sliding direction. Therefore, even when the connector of the connector pair has a positional displacement and/or inclination from each other and a relative positional displacement in the sliding direction has occurred, self-correction is performed by elastic deformation of the mounting member. Thus, the connector component according to the present invention allows easily performing coupling of connectors with each other.

Also, there may be a mode in which the mounting member is formed of rubber.

Moreover, there may be a mode in which the mounting member is bonded to the connector and the base bracket by vulcanization bonding. In this case, a sliding movement does not occur at a connection part between the mounting member and the connector, so that the occurrence of wear and noise of the members can be suppressed.

Moreover, there may be a mode in which the base bracket is provided with an opening portion on which a stopper portion that projects from a front surface of the connector closer to the base bracket is locked in a penetrating manner, and by cooperation of the stopper portion of the connector with the opening portion of the base bracket, detachment of the connector from the base bracket is prevented.

Moreover, there may be a mode in which, on one front surface out of a front surface of the base bracket closer to the connector and a front surface of the connector closer to the base bracket, a restricting portion that projects toward the other front surface, and restricts inclination of the base bracket and the connector by being brought into contact with the other front surface is provided.

Moreover, there may be a mode of further including a mounting attachment for fixing the mounting member to the base bracket, in which the mounting member is in a tubular shape extending in an opposing direction between the connector and the base bracket, the mounting attachment has an annular eaves portion embedded in the mounting member so as to surround an inner hole of the mounting member, and not to be brought into contact with the base bracket, and the mounting member has an annular projection portion formed at a position, of a surface opposed to the base bracket, corresponding to the annular eaves portion.

In this case, when the mounting member is attached to the base bracket, the annular projection portion formed on the surface opposed to the base bracket of the mounting member is compressed sandwiched between the eaves portion of the mounting attachment and the base bracket. As a result, a high internal stress is produced in an annular part surrounding the inner hole of the mounting member, sandwiched between the eaves portion of the mounting attachment and the base bracket, so that high sealability in the inner hole of the mounting member is realized.

Also, the connector component according to the present invention may be an automotive equipment-side connector component, and may be a battery-side connector component.

Advantageous Effects of Invention

The present invention provides a connector component that allows easily performing coupling of connectors with each other.

DESCRIPTION OF EMBODIMENTS

Hereinafter, preferred embodiments of the present invention will be described in detail with reference to the accompanying drawings. Also, in the description, for the same elements or elements having the same functions, the same reference signs will be used, and overlapping description will be omitted.

First Embodiment

Hereinafter, a mounted state of a battery unit of an electric vehicle according to a first embodiment of the present invention will be described while referring to FIG. 1 to FIG. 3. Also, the coordinate axes in the figures are shown with reference to a vehicle, in which the X-axis indicates a front-rear direction of the vehicle, the Y-axis indicates a left-right direction of the vehicle, and the Z-axis indicates a height direction of the vehicle.

Figure 1:
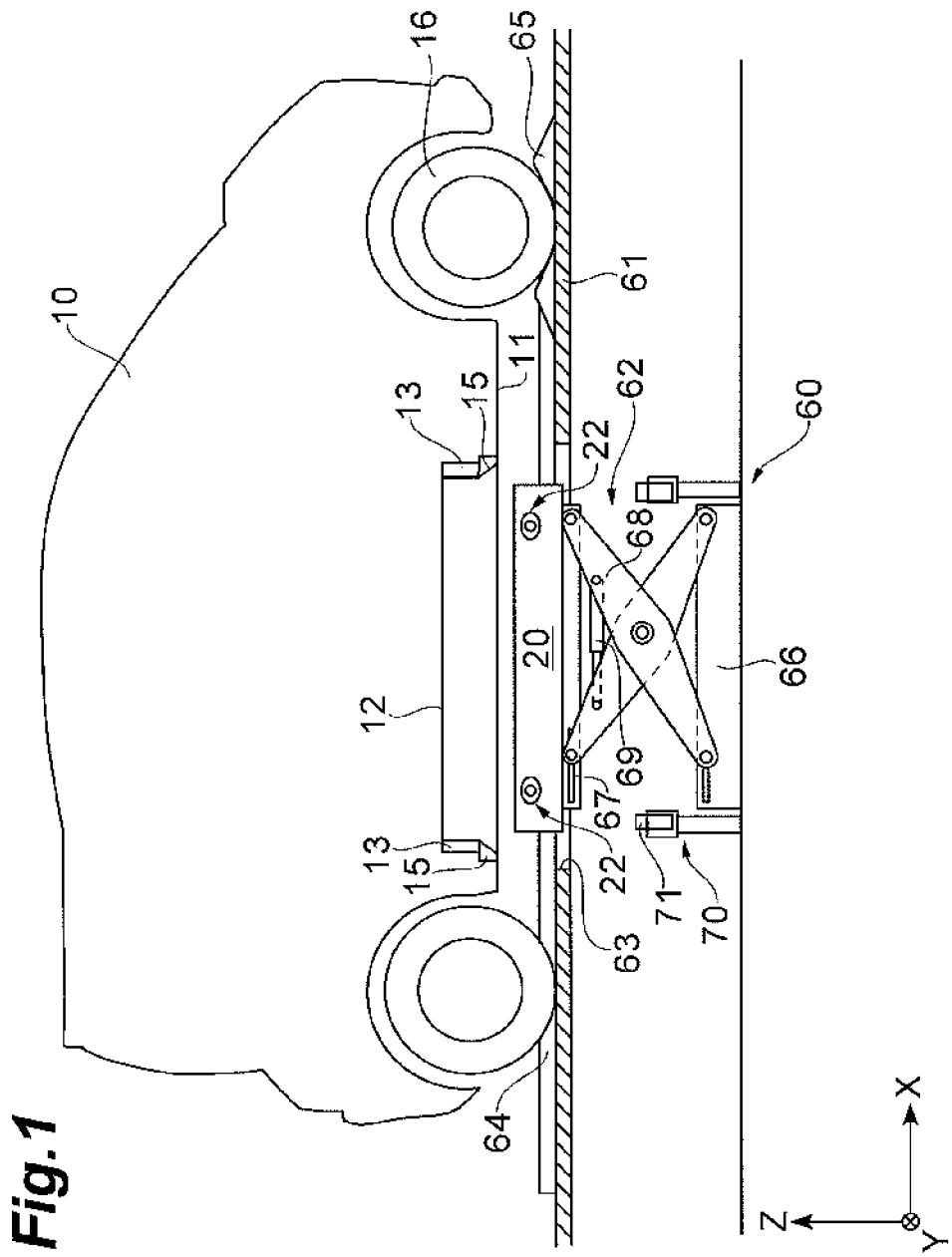
FIG. 1 is a view showing a mounted state of a battery unit of an electric vehicle according to an embodiment of the present invention.
Figure 2:
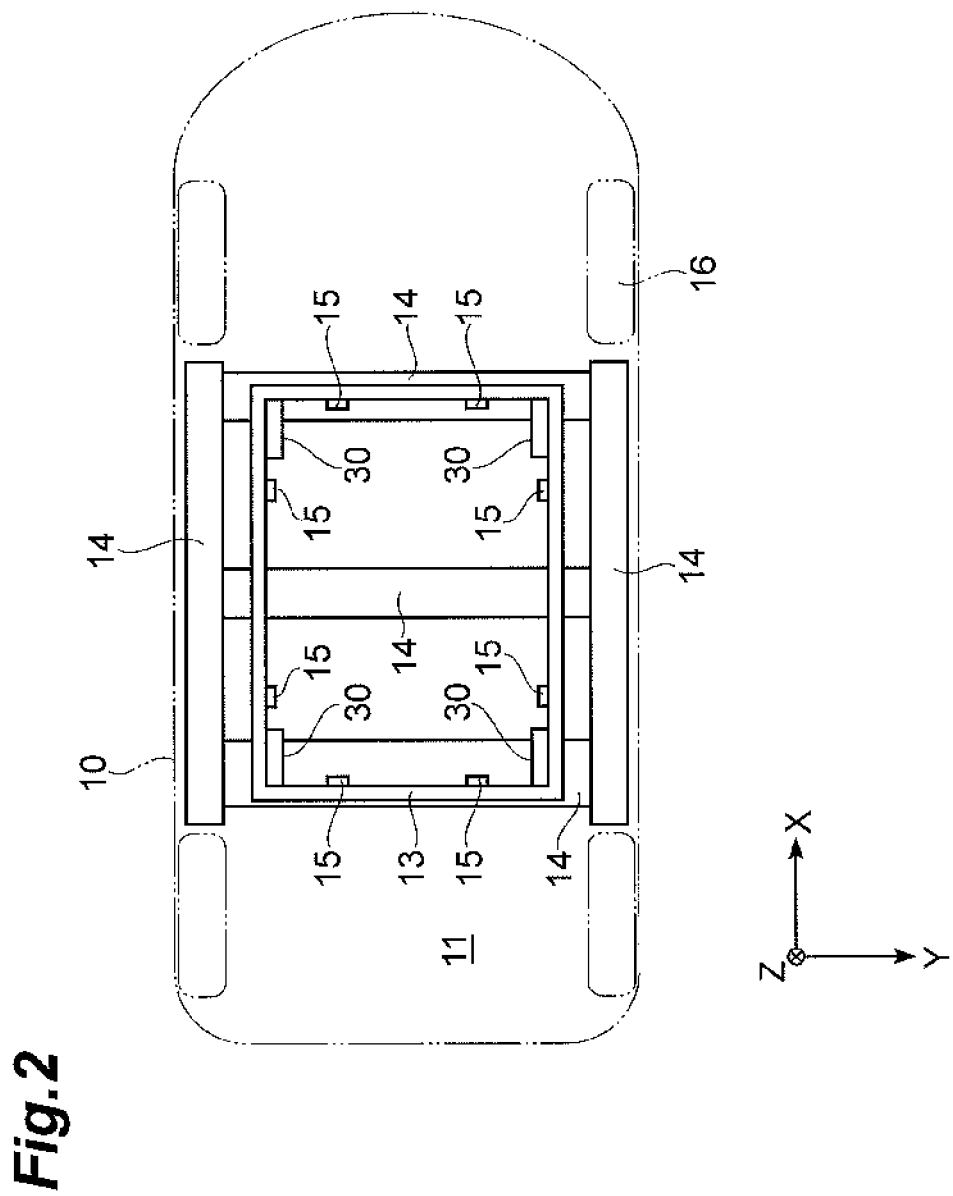
FIG. 2 is a view showing a bottom surface of the electric vehicle shown in FIG. 1.
Figure 3:
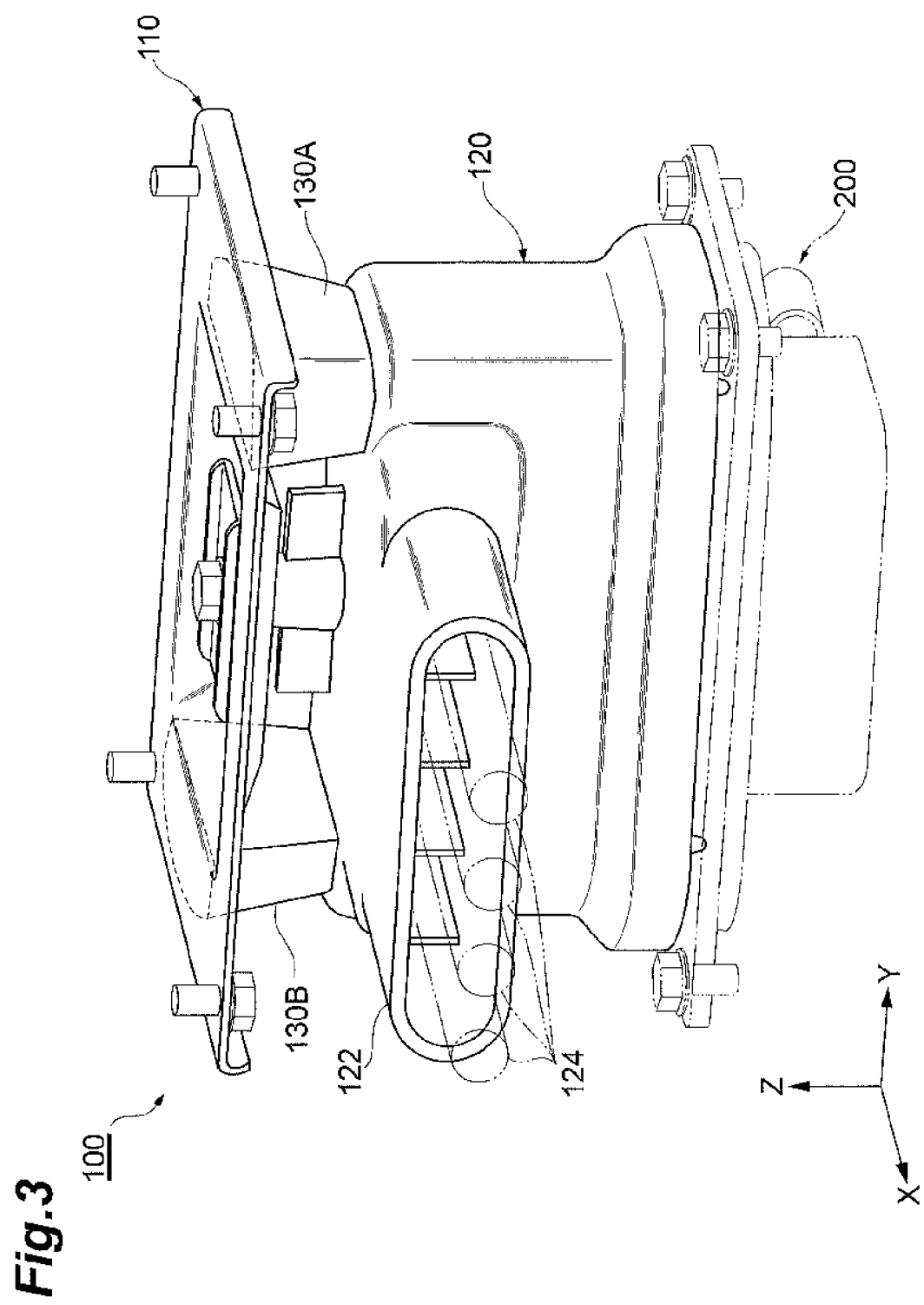
FIG. 3 is a perspective view showing a vehicle-side electrical connector according to a first embodiment of the present invention.

As shown in FIG. 1 and FIG. 2, on a bottom portion 11 of the electric vehicle 10, a battery fixing portion 12 to and from which a battery unit 20 can be attached and removed from the downside of the vehicle is provided.

The battery fixing portion 12 is composed of a vehicle bottom framework portion 14 such as a floor pan of a vehicle bottom portion, side member rocker portions, and a reinforce that is bridged between the left and right side member rocker portions and a frame body 13 that protects the battery unit 20 attached to the battery fixing portion 12. The frame body 13 has a rectangular external shape extending in the vehicle front-rear direction, has a framing made of an iron material, and is attached to the vehicle bottom framework portion 14.

To the vehicle bottom framework portion 14, battery fixing devices (battery housing supports) 30 are attached so as to contact the inner periphery of the frame body 13. In the present embodiment, four battery fixing devices 30 are attached, at the four corners of the frame body 13, so as to contact left and right sides located on the sides of vehicle side surfaces.

Moreover, to the frame body 13, vehicle-side guide pieces 15 that widen in a tapered manner toward the downside of the vehicle are provided two each for each side. Further, to the frame body 13, a vehicle-side electrical connector 100 to be described later for electrically connecting automotive equipment mounted in the vehicle and the battery unit 20 is attached.

To the outer surface of the battery unit 20, strikers 22 for fixing the battery unit 20 to the vehicle by being supported on the battery fixing devices 30 are attached.

Moreover, at spots corresponding to the vehicle-side guide pieces 15 in a state of the battery unit 20 being attached to the battery fixing portion 12 of the vehicle, semi-cylindrical battery-side guide pieces are attached. Further, at a spot corresponding to the vehicle-side electrical connector 100 in the battery unit 20, a battery-side electrical connector 200 to be described later is provided, and in a state where the battery unit 20 is disposed on the battery fixing portion 12, the vehicle-side electrical connector 100 and the battery-side electrical connector 200 are connected to reach an electrically connected state.

Next, a battery replacing apparatus 60 for replacement of the battery unit 20 of the electric vehicle 10 will be described. As shown in FIG. 1, the battery replacing apparatus 60 is disposed underground at its lower section, and is disposed on the ground at its upper section. In the upper section of the battery replacing apparatus 60, a horizontal loading platform 61 that can carry the electric vehicle 10 is provided, and the loading platform 61 is provided with an opening portion 63 through which the battery unit 20 and a lifting and lowering means 62 that lifts and lowers the battery unit 20 can move up and down and pass. Further, on an upper portion of the loading platform 61, a pair of positioning rails 64 that perform positioning in the vehicle width direction of the electric vehicle 10 are installed, across the opening portion 63, so that the battery fixing portion 12 of the electric vehicle 10 is disposed over the opening portion 63. And, at an end of the positioning rail 64, a double bump-shaped wheel stopper 65 that performs positioning in the front-rear direction of the electric vehicle 10 is installed so that the battery fixing portion 12 of the electric vehicle 10 is disposed over the opening portion 63.

Also, in the electric vehicle 10, it is desirable that the position of the battery fixing portion 12 with respect to an axle of front wheels 16 has been standardized to be unified in all models. And, at the time of battery replacement of the electric vehicle 10, the electric vehicle 10 is moved so that the positioning rails 64 are disposed between the front wheels 16 of the electric vehicle 10. And, by stopping the vehicle so that the front wheel 16 is located at the middle of the double bump-shaped wheel stopper 65, some degree of alignment is performed between the battery fixing portion 12 of the electric vehicle 10 and the lifting and lowering means 62 of the battery replacing apparatus 60. Accordingly, it is possible to reduce a positional displacement between the position of the battery fixing portion 12 and the lifting and lowering means 62 in the vehicle front-rear direction caused by a difference in the contact state of a tier against the wheel stopper 65 to a level of a few tens of millimeters.

In the battery replacing apparatus 60, the lifting and lowering means 62 is provided at a position where the same can move up and down in the up-down direction through the opening portion 63 of the loading platform 61. The lifting and lowering means 62 is a device for housing the battery unit 20 detached from the electric vehicle 10 in the battery replacing apparatus 60 or transferring a battery unit that has been kept in the battery replacing apparatus 60 to the battery fixing portion 12 of the electric vehicle 10, and is composed of a base 66, a transfer table 67, arms 68, and a hydraulic cylinder 69 for lifting and lowering the transfer table.

Around the lifting and lowering means 62 in the battery replacing apparatus 60, a conveying means 70 formed of a chain conveyer 71 is installed. The conveying means 70 is a device that conveys the battery unit 20 between a transfer position to transfer the battery unit 20 between the same and the lifting and lowering means 62 and a battery storage means (not shown). Also, the battery storage means is a device that temporarily stores a recovered used battery unit 20 and stores a charged battery unit 20 after charging, and is constructed by, for example, an automated warehouse.

By the battery replacing apparatus 60 thus configured, the battery unit 20 mounted in the electric vehicle 10 is replaced. At the time of replacement of the battery unit 20, the electric vehicle 10 is moved onto the loading platform 61 of the battery replacing device, and the front wheel 16 of the electric vehicle 10 is stopped so as to be located at the middle of the double bump shape of the wheel stopper 65. After the stop, when a battery replacement command is issued, the battery replacing apparatus 60, by driving the hydraulic cylinder 69, lifts the transfer table 67 to bring the transfer table 67 into contact with a bottom surface of the battery unit 20 housed in the battery fixing portion 12.

After the contact, by manually switching a changeover switch provided in the vehicle, locking by the battery fixing devices 30 that have fixed the battery unit 20 to the electric vehicle 10 is released. Thereafter, the battery replacing apparatus 60 lowers the transfer table 67 by driving the hydraulic cylinder 69, so that the battery unit 20 is housed in the battery replacing apparatus 60. The housed battery unit 20 is, by the conveying means 70, conveyed to the battery storage means and kept.

Then, another charged battery unit 20 that has been stored in the battery storage means is taken out of the battery storage means, and conveyed up to the lifting and lowering means 62 by the conveying means 70. The battery unit 20 conveyed to the lifting and lowering means 62 is lifted by the lifting and lowering means 62. A positional displacement between the battery fixing portion 12 and the battery unit 20 is corrected, when the battery unit 20 is lifted, by the battery-side guide pieces attached to the battery unit 20 and the vehicle-side guide pieces 15 contacting each other. When the lifting of the battery unit 20 is continued, a positional displacement and/or inclination of the battery unit 20 is corrected by the both-side guide pieces, so that the battery unit 20 is inserted into the battery fixing portion 12.

Also, around the battery fixing portion 12 of the bottom portion 11 of the vehicle, there are attached a plurality of press switches (not shown), and when all switches have been pressed by the transfer table 67, it is detected as a state where the battery unit 20 is housed in the battery fixing portion 12. After the state where the battery unit 20 is housed in the battery fixing portion 12 is detected, by manually activating a changeover switch for a motor provided in the vehicle to bring the battery fixing devices 30 into a locking state, the battery unit 20 is locked, so that the battery of the electric vehicle is replaced.

Figure 4:
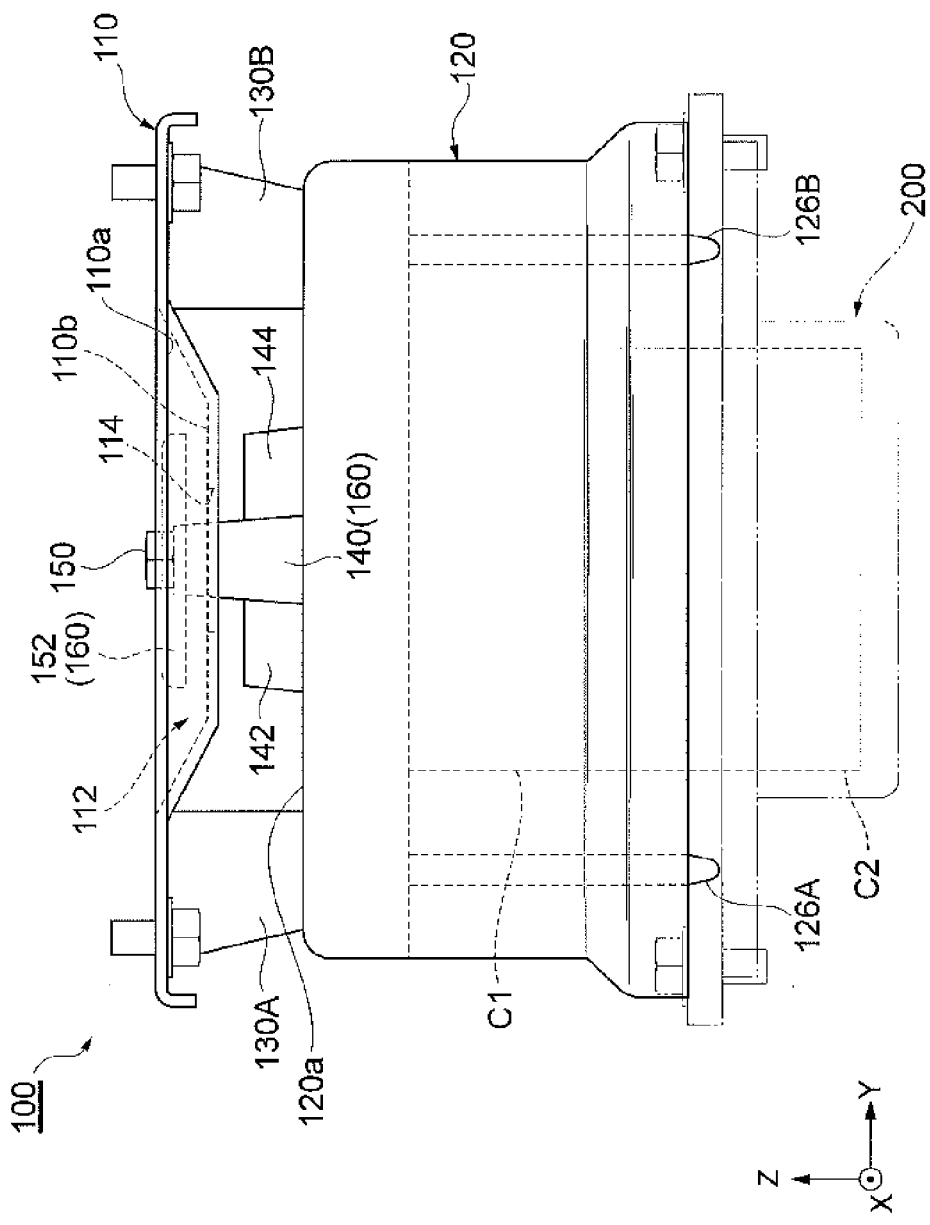
FIG. 4 is a side view of the vehicle-side electrical connector shown in FIG. 3.

Here, the vehicle-side electrical connector (connector component) 100 to be attached to the frame body 13 of the battery fixing portion 12 will be described while referring to FIG. 3 and FIG. 4.

The vehicle-side electrical connector 100 is composed of a base bracket 110, a vehicle-side connector (automotive equipment-side connector) 120, and a pair of mounting members 130A, 130B.

The base bracket 110 is formed by a rectangular-shaped metal plate, and shaped by cutting and bending. The base bracket 110 is bolted on to the frame body 13 of the battery fixing portion 12 from the side of a lower surface 110a at its four corners so as to face the frame body 13, that is, so as to become parallel with respect to an X-Y plane. At a central portion of the base plate 110, a portion of a depression 112 that is depressed downward is formed, and a bottom surface 110b of the depression portion 112 is provided with an opening portion 114.

The vehicle-side connector 120 has a substantially rectangular parallelepiped shape extending along the longitudinal direction (Y-direction) of the base bracket 110. The vehicle-side connector 120 is provided inside thereof with a connector terminal C1 and various types of wiring. The connector terminal C1 of the vehicle-side connector 120 is connected to a connector terminal C2 of the battery-side electrical connector 200, electric power and a signal input to the connector terminal C1 are transmitted, via a cable 124, to predetermined electrical equipment mounted in the electric vehicle 10. Also, from the lower end of the vehicle-side connector 120, a pair of alignment pins 126A, 126B to be used for alignment with the battery-side electrical connector 200 are disposed lined up in the Y-direction.

On an upper end surface 120a of the vehicle-side connector 120, at a position corresponding to the opening portion 114 of the base bracket 110, a protrusion portion 140 that projects toward the base bracket 110 side is provided. This protrusion portion 140 has a height to reach the opening portion 114 of the base bracket 110, and at its top portion, a flange portion 152 is attached by a bolt 150. The flange portion 152 is a rectangular plate having a width larger than the width of the opening portion 114, and similar to the base bracket 110, is provided in parallel with respect to an X-Y plane.

The protrusion portion 140 and the flange portion 152 compose a stopper portion 160. By this stopper portion 160, in cooperation with the opening portion 114 of the base bracket 110, detachment of the vehicle-side connector 120 from the base bracket 110 is prevented. That is, when the mounting members 130A, 130B to be described later have excessively stretched, as a result of the flange portion 152 of the stopper portion 160 having a width larger than the width of the opening portion 114 being locked on the opening portion 114, a downward movement of the vehicle-side connector 120 is restricted.

On both sides of the protrusion portion 140 in the upper end surface 120a of the vehicle-side connector 120, in a manner integral with the protrusion portion 140, a pair of planar ribs (restricting portions) 142, 144 that are parallel with respect to a Y-Z plane are provided symmetrically with respect to the protrusion portion 140. That is, similar to the protrusion portion 140, these ribs 142, 144 also project from the upper end surface 120a of the vehicle-side connector 120 toward a lower surface of the base bracket 110.

The pair of mounting members 130A, 130B are members for causing the vehicle-side connector 120 to be mounted in a state spaced at a predetermined interval with respect to the base bracket 110, and are formed of rubber being a soft material. The connecting positions in the base bracket 110 of the mounting members 130A, 130B are on the lower surface of the base bracket 110, and are both end positions in the longitudinal direction. Moreover, the connecting positions in the vehicle-side connector 120 of the mounting members 130A, 130B are on the upper end surface 120a of the vehicle-side connector 120, and are both end positions in the longitudinal direction. Such a connection of the mounting members 130A, 130B with the base bracket 110 and the vehicle-side connector 120 is performed by vulcanization bonding. Also, the mounting members 130A, 130B both have semi-columnar shapes extending in the Z-direction, and are disposed so that their plane portions face each other.

Figure 7:
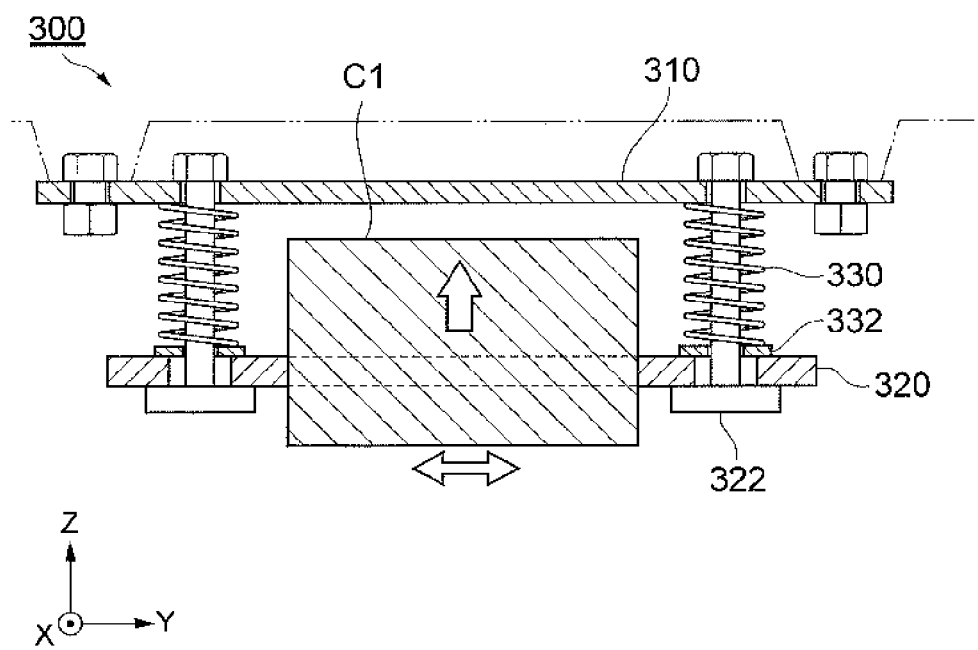
FIG. 7 is a view showing a connector component according to the conventional art.

The vehicle-side electrical connector 100 and the battery-side electrical connector 200 are connected with each other, as described above, when attaching the battery unit 20 to the battery fixing portion 12. In that case, it is desired to self-correct a positional displacement and/or inclination to some extent. But, the connector component 300 shown in FIG. 7 does not have a function of permitting a relative positional displacement in a sliding direction between the base bracket 310 and the support plate 320.

Therefore, in such a case of relative positional displacement, a coil spring deflection and a sliding movement between the coil spring 330 and the support plate 320 (or a sliding movement between these and a washer 332) occurs, and it is considered that contact between the constituent members such as metal components can cause the occurrence of wear and noise of the members. Further, a situation that metal powder caused by wear enters into a connector is also likely to occur.

Furthermore, in the connector component 300, with regard also to a relative positional displacement in the compressing direction, when some level of large displacement has occurred, similar to a relative positional displacement in a sliding direction, contact between the constituent members is likely to cause the occurrence of wear and noise of the members.

On the other hand, in the vehicle-side electrical connector 100 described above, because the base bracket 110 is mounted with the vehicle-side connector 120 via the mounting members 130A, 130B formed of rubber, for the base bracket 110 and the vehicle-side connector 120, a relative positional displacement in the compressing direction (Z-direction) as well as a relative positional displacement in a sliding direction (a direction in an X-Y plane) are permitted by elastic deformation of the mounting members.

Therefore, even when there is a positional displacement and/or inclination between the vehicle-side electrical connector 100 and the battery-side electrical connector 200 and a relative positional displacement in the sliding direction has occurred, self-correction is performed by elastic deformation of the mounting members 130A, 130B. Thus, according to the vehicle-side electrical connector 100, coupling when coupling the battery-side electrical connector 200 can be easily performed.

Moreover, there is a setting so that, in a state of the battery unit 20 being attached to the battery fixing portion 12, the battery unit 20 is fixed to a position where the mounting members 130A, 130B are compressed by the battery-side electrical connector 200. As a result, the mounting members 130A, 130B apply an urging force downward to the battery unit 20, so that vibration in the up-down direction during vehicle traveling can be prevented.

Also, in the foregoing case of elastic deformation of the mounting members 130A, 130B, because contact between the constituent members does not occur, the occurrence of wear and noise of the members is suppressed. Particularly, in the embodiment described above, because the mounting members 130A, 130B and the base bracket 110 and the vehicle-side connectors 120 are bonded by vulcanization bonding, the occurrence of wear and noise of the members is more effectively suppressed.

Additionally, for the vehicle-side electrical connector 100, because the vehicle-side connector 120 and the base bracket 110 are integrally constructed via the mounting members 130A, 130B, in the case of mounting, components such as spring coils, fixed shafts, and washers are no longer necessary, and a reduction in cost and the number of components is also achieved.

The volume and shape of mounting members can be appropriately changed, and can also be displaced selectively (or preferentially) in a direction that meets a condition. Moreover, because elastic deformation of the mounting members makes vibration of the vehicle-side connector 120 less likely to be transmitted to the base bracket 110 and the vehicle, silence of the cabin interior and the like is improved. Further, due to insulation properties of the mounting members, a situation that a high voltage that is input to the vehicle-side connector 120 leaks to the vehicle body due to failure or the like can be avoided.

Figure 5:
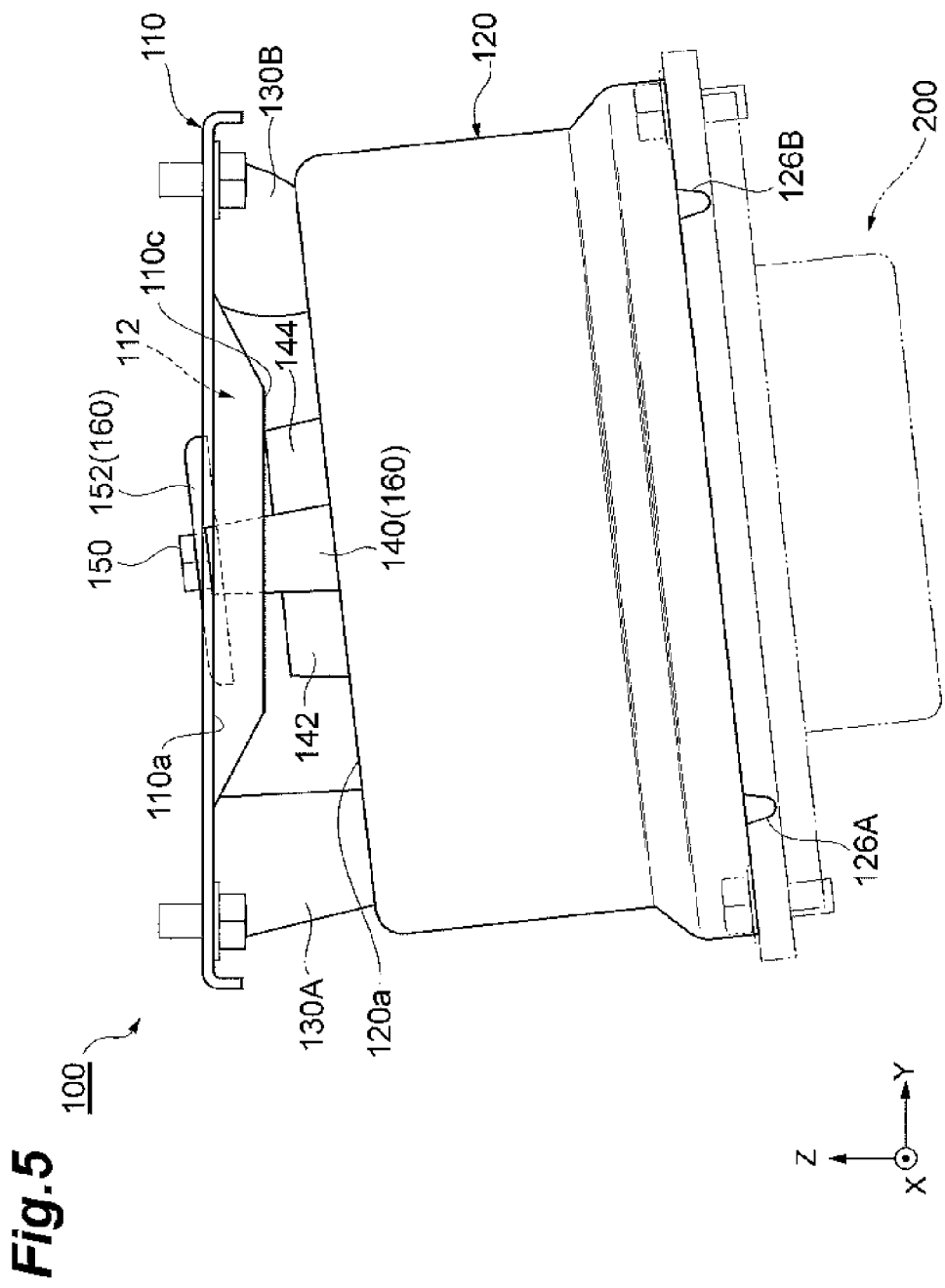
FIG. 5 is a view showing an inclined state when a battery-side electrical connector is connected to the vehicle-side electrical connector shown in FIG. 4.

Then, the function of the ribs 142, 144 provided on the upper end surface 120a of the vehicle-side connector 120 will be described while referring to FIG. 5.

When connecting the vehicle-side electrical connector 100 and the battery-side electrical connector 200, an upward external force in the Z-direction such as to bring the vehicle-side connector 120 close to the base bracket 110 is applied. In that case, as shown in FIG. 5, when the battery-side electrical connector 200 has an inclination toward one mounting member side (for example, the mounting member 130B side), the mounting member is greatly compression-deformed, and the vehicle-side connector 120 is greatly inclined with respect to the base bracket 110. At this time, the ribs 142, 144, by being brought into contact against a lower surface 110c of the depression portion 112 of the base bracket 110, can restrict a further inclination, so that the face-to-face arrangement between the base bracket 110 and the vehicle-side connector 120 can be maintained.

In the embodiment described above, because there are provided a pair of ribs 142, 144 lined in the Y-direction and symmetrically with respect to the protrusion portion 140 to restrict the foregoing inclination at the two spots, the face-to-face arrangement between the base bracket 110 and the vehicle-side connector 120 can be maintained more effectively. That is, for maintaining the face-to-face arrangement between the base bracket 110 and the vehicle-side connector 120 more efficiently, it is preferable to provide a plurality of ribs.

Also, restricting portions that restrict inclination of the base bracket 110 and the vehicle-side connector 120, like the ribs 142, 144 described above, can be in a mode of projecting from the front surface (lower surface 110a) closer to the vehicle-side connector 120 of the base bracket 110 toward the upper end surface 120a of the vehicle-side connector 120, besides the mode of projecting from the front surface (upper end surface 120a) closer to the base bracket 110 of the vehicle-side connector 120 toward the lower surface 110a of the base bracket 110.

In either mode of restricting portions, the restricting portions provided on one front surface, by being brought into contact against the other front surface, can restrict an inclination of the base bracket 110 and the vehicle-side connector 120.

Figure 6:
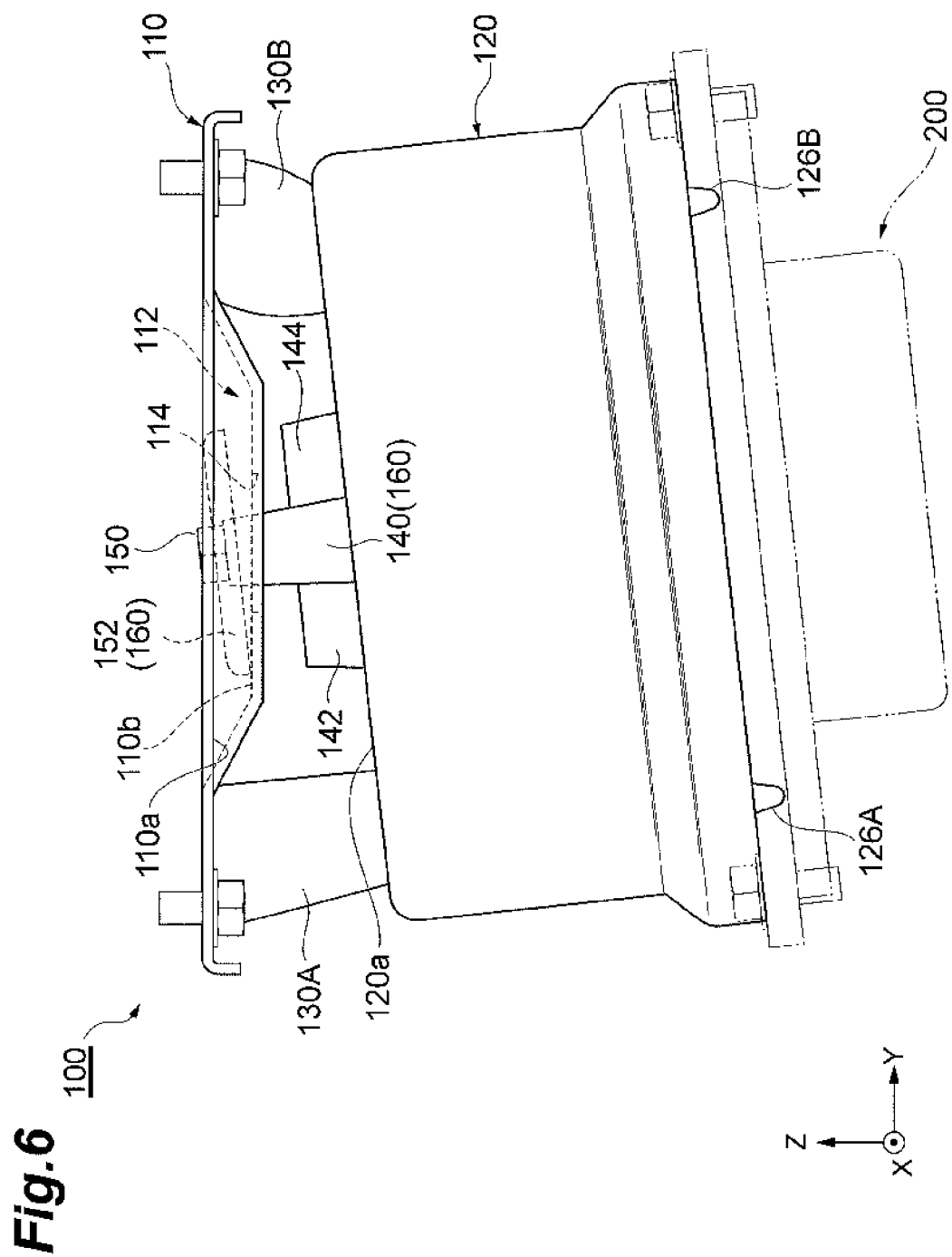
FIG. 6 is a view showing an inclined state when a battery-side electrical connector is withdrawn from the vehicle-side electrical connector shown in FIG. 4.

Next, the function of the stopper portion 160 composed of the protrusion portion 140 and the flange portion 152 will be described while referring to FIG. 6.

When withdrawing the battery-side electrical connector 200 from the vehicle-side electrical connector 100, a downward external force in the Z-direction such as to move the vehicle-side connector 120 away from the base bracket 110 is applied. In that case, as shown in FIG. 6, when the battery-side electrical connector 200 has an inclination toward one mounting member side (for example, the mounting member 130B side), the mounting member is greatly tensile-deformed or compression-deformed, and the vehicle-side connector 120 is greatly inclined with respect to the base bracket 110. At this time, the flange portion 152 of the stopper portion 160, by contacting an end portion thereof the bottom surface 110b of the depression portion 112, can restrict a further inclination, so that the face-to-face arrangement between the base bracket 110 and the vehicle-side connector 120 can be maintained.

Second Embodiment

Next, a second embodiment of the present invention will be described while referring to FIG. 8 to FIG. 11. The second embodiment is different from the first embodiment described above in the structure of a vehicle-side electrical connector and battery-side electrical connector, and is the same in other aspects.

The vehicle-side electrical connector 100A according to the second embodiment is composed of a base bracket 110A and a vehicle-side connector (automotive equipment-side connector) 120.

The base bracket 110A has the same structure as that of the base bracket 110 of the first embodiment described above except for the point of not including a portion of a depression 112 and an opening portion 114. Also, the vehicle-side connector 120 is also the same in structure as the vehicle-side connector of the first embodiment described above.

Because the vehicle-side electrical connector 100A does not include the mounting members 130A, 130B described above, the base bracket 110A is directly connected to the upper end surface of the vehicle-side connector 120. The connection between the vehicle-side connector 120 and the base bracket 110A is performed by, for example, bonding such as vulcanization bonding.

Figure 9:
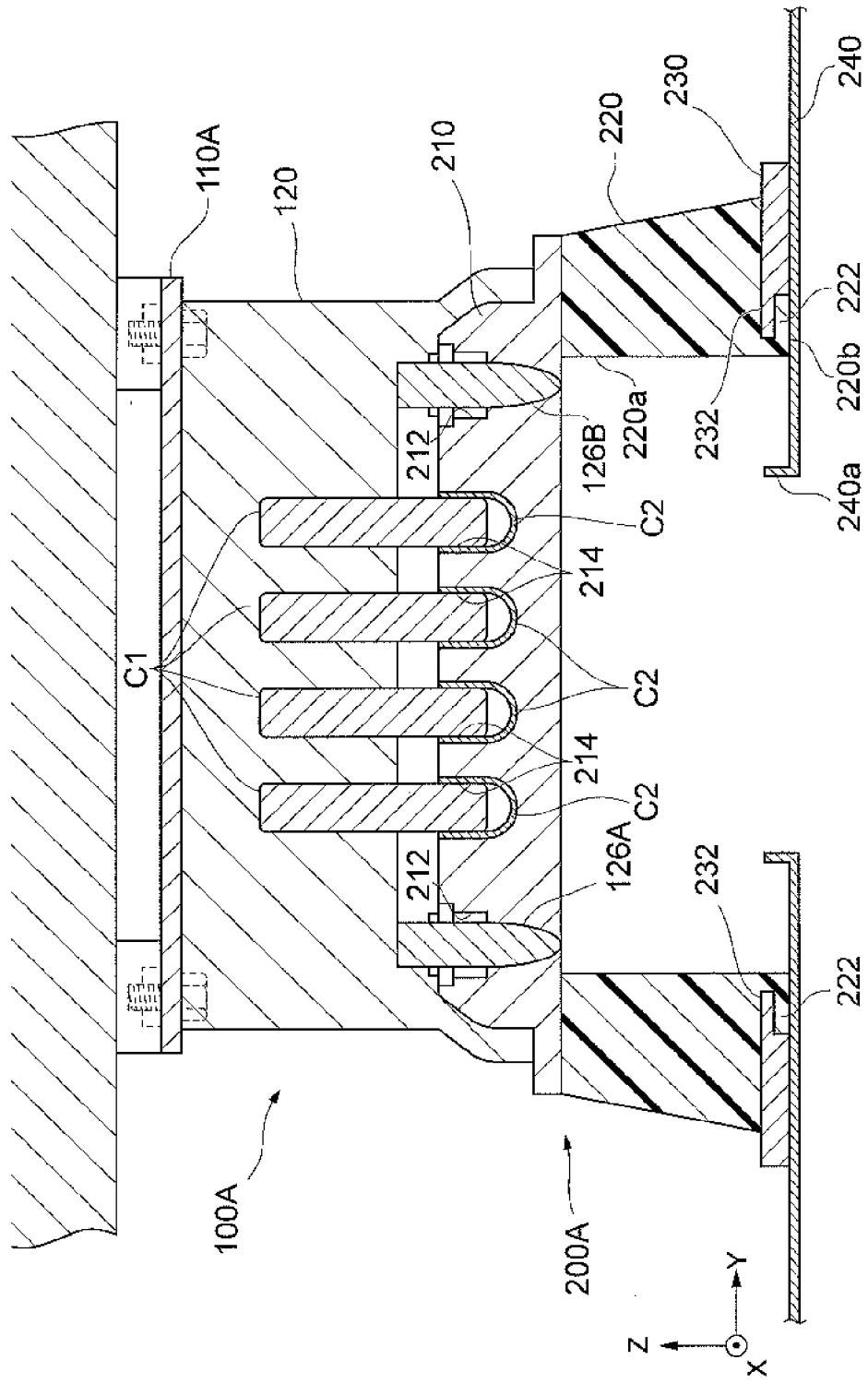
FIG. 9 is a sectional view taken along a line IX-IX of the connector pair shown in FIG. 8.
Figure 10:
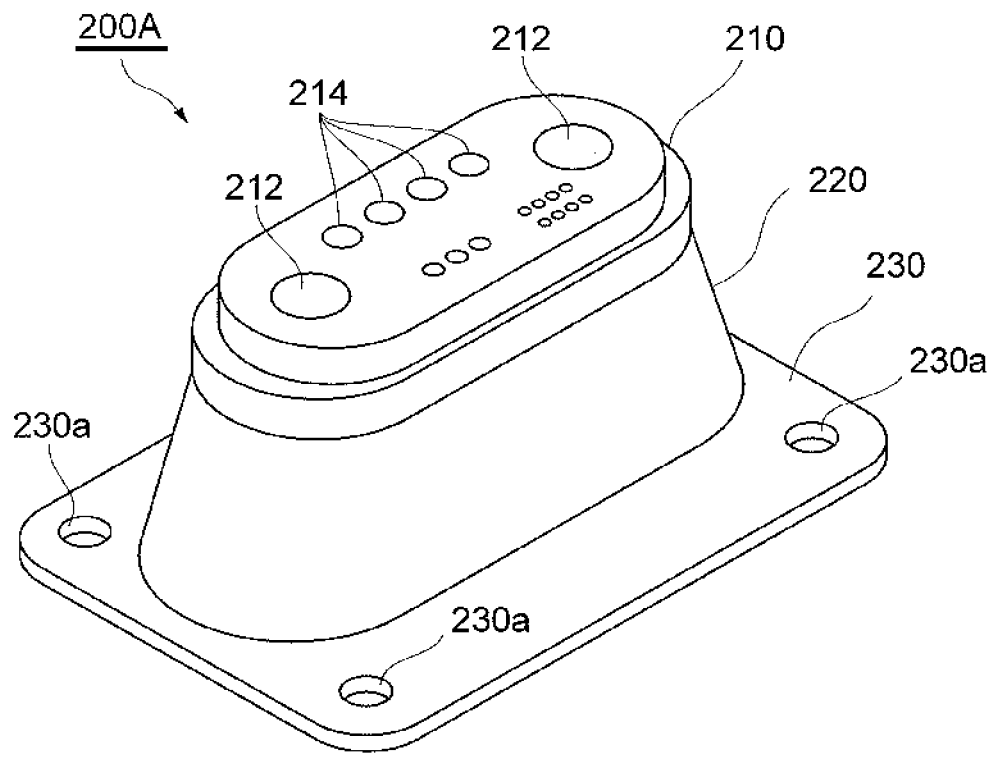
FIG. 10 is a perspective view showing a mounting member and a mounting attachment according to the second embodiment of the present invention.
Figure 11:
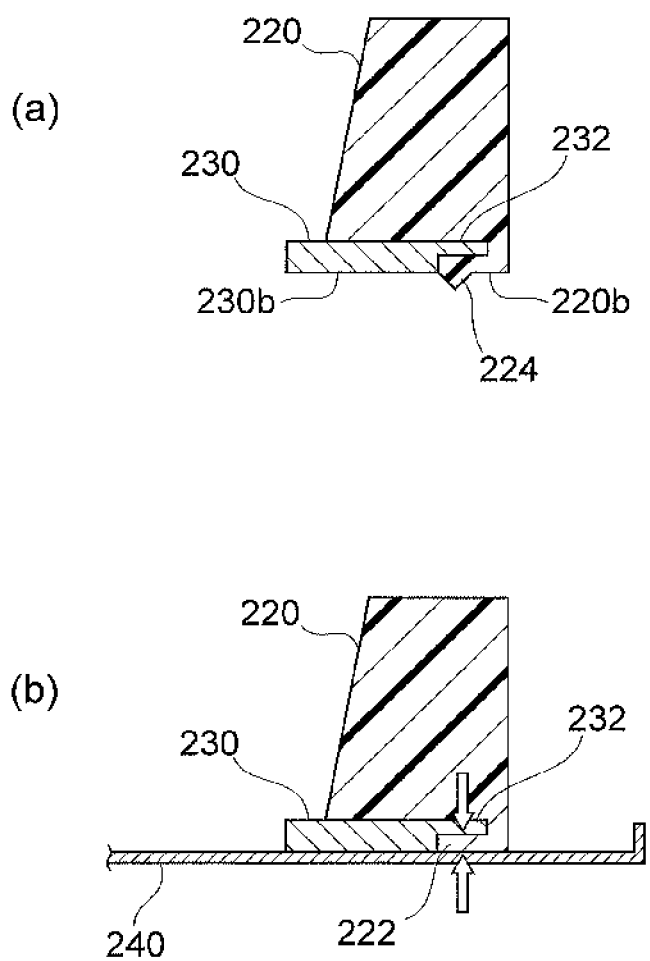
FIG. 11 includes views showing (a) a state of the mounting member before attachment and (b) a state of the mounting member after attachment.

The battery-side electrical connector 200A according to the second embodiment is, as shown in FIG. 9 and FIG. 10, composed of a battery-side connector 210, a mounting member 220, and a mounting attachment 230.

The battery-side connector 210 is a part that is fitted with the vehicle-side connector 120 from the downside, and at its upper end surface, holes 212, 214 into which alignment pins 126A, 126B and connector terminals C1 of the vehicle-side connector 120 are inserted are respectively provided. In the respective holes 214 into which the connector terminals C1 are inserted, connector terminals C2 of the battery-side electrical connector 200 are disposed, respectively. The battery-side connector 210 is mounted on a base bracket 240 via the mounting member 220. Also, although not shown, similar to the vehicle-side connector of the first embodiment, on the battery-side connector 210, a protrusion portion that projects toward the base bracket 240 is provided, and the protrusion portion and a flange portion compose a stopper portion.

Similar to the mounting members 130A, 130B of the first embodiment, the mounting member 220 is a member for causing the battery-side connector 210 to be mounted in a state spaced at a predetermined interval with respect to the base bracket 240, and is formed of rubber being a soft material. The mounting member 220 is in a tubular shape extending in an opposing direction (Z-direction) between the battery-side connector 210 and the base bracket 240, the external shape of an X-Y section of which is an elliptical shape having a long diameter direction in the Y-direction. The mounting member 220 is, at its upper end surface, bonded to the battery-side connector 210. Through an inner hole 220a of the mounting member 220, a cable (not shown) electrically connected with the connector terminal C2 is passed, and also in a region of the base bracket 240 corresponding to the inner hole 220a, a through-hole 240a for a cable is provided. Also, on a lower end surface (that is, a surface opposed to the base bracket 240) 220b of the mounting member 220, as to be described later, an annular projection portion 224 surrounding the inner hole 220a of the mounting member 220 is formed.

The mounting member 220 of the second embodiment provides the same effects as those of the mounting members 130A, 130B of the first embodiment. That is, according to the mounting member 220, for the base bracket 240 and the battery-side connector 210, a relative positional displacement in the compressing direction (Z-direction) as well as a relative positional displacement in a sliding direction (a direction in an X-Y plane) are permitted by elastic deformation of the mounting member.

The mounting attachment 230 is an annular rectangular flat plate interposed in part between the mounting member 220 and the base bracket 240 and having external dimensions larger than those of the mounting member 220, and is embedded in a lower end portion of the mounting member 220 so as to surround the inner hole 220a of the mounting member 220. The mounting attachment 230 is bonded to the mounting member 220. At an inner edge of the mounting attachment 230, an eaves portion 232 is formed throughout the entire edge region (that is, throughout the entire circumference of the inner hole 220a of the mounting member 220). The eaves portion 232 is a part that was designed so as to separate by a predetermined distance from a lower end surface 230b of the mounting attachment 230, and is not brought into contact against the base bracket 240. The eaves portion 232 is located outside further than the inner hole 220a of the mounting member 220, and buried near the inner hole 220a of the mounting member 220, and over, under, and lateral to the eaves portion 232, the material of the mounting member 220 exists.

Figure 8:
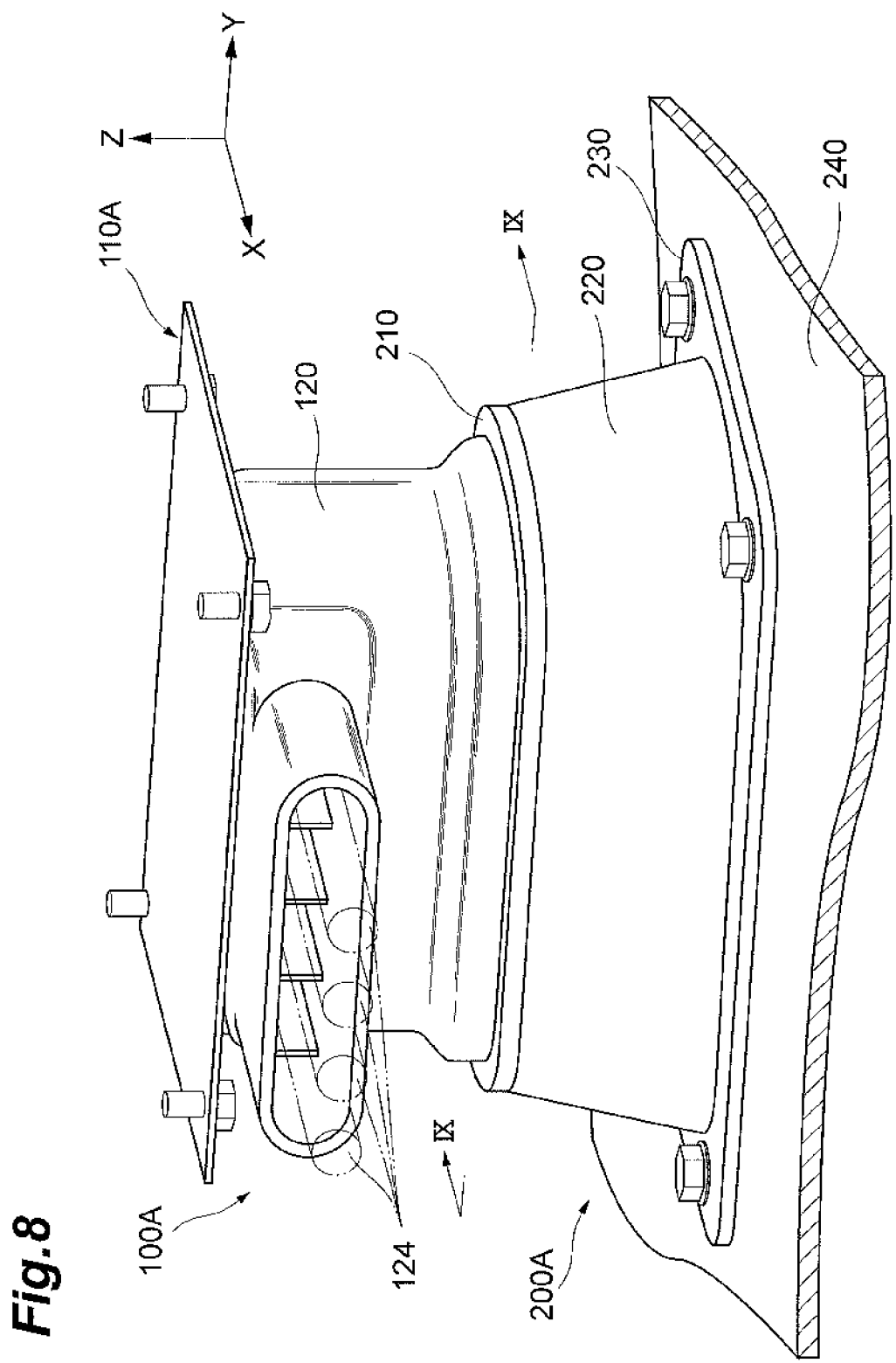
FIG. 8 is a perspective view showing a connector pair according to a second embodiment of the present invention.

There are provided through-holes 230a at the four corners of the mounting attachment 230, and the mounting attachment 230 is, as shown in FIG. 8, bolted on to the base bracket 240 by use of the through-holes 230a.

Then, the annular projection portion 224 formed on the lower end surface 220b of the mounting member 220 will be described while referring to FIGS. 11(a) and (b).

As shown in FIG. 11(a), on the lower end surface 220b of the mounting member 220, there is formed an annular projection portion 224 at a position corresponding to an eaves portion 232 of the mounting attachment 230. That is, similar to the eaves portion 232, the annular projection portion 224 is formed throughout the entire circumference of the inner hole 220a of the mounting member 220. The annular projection portion 224 has a section in a triangular shape that is sharpened at its point. Also, the sectional shape of the annular projection portion 224 is not limited to a triangle, and may be a trapezoid or a semicircle.

Because the annular projection portion 224 is projected from the lower end surface 220b of the mounting member 220 and the lower end surface 230b of the mounting attachment 230, when the lower end surface 230b of the mounting attachment 230 and an upper surface of the base bracket 240 are fitted together so as to be closely adhered, a part 222 sandwiched between the eaves portion 232 of the mounting attachment 230 and the base bracket 240 is pressed from the up and down directions to produce a high internal stress. Here, the annular projection portion 224 and the eaves portion 232 are formed throughout the entire circumference of the inner hole 220a of the mounting member 220, the compressed part 222 sandwiched between the eaves portion 232 of the mounting attachment 230 and the base bracket 240 is also produced throughout the entire circumference of the inner hole 220a of the mounting member 220. In such an annular compressed part 222, there is improved adhesion at a joint surface between the mounting member 220 and the base bracket 240.

As described above, in the battery-side electrical connector 200A, even when there is a positional displacement and/or inclination between the vehicle-side electrical connector 100A and the battery-side electrical connector 200A and a relative positional displacement in the sliding direction has occurred, self-correction is performed by elastic deformation of the mounting member 220. Thus, according to the battery-side electrical connector 200A, coupling when coupling the vehicle-side electrical connector 100A can be easily performed.

Furthermore, because high sealability in the inner hole 220a of the mounting member 220 is realized as a result of the adhesion at a contact surface between the mounting member 220 and the base bracket 240 being improved by the annular compressed part 222 described above, entrance of water into the interior of a case of the battery-side electrical connector 200A can be effectively prevented. Also, according to the conventional art, a separate waterproof seal has been required for exclusive use in order to prevent entrance of water into the interior of a battery case, which has caused an increase in the number of components, but according to the battery-side electrical connector 200A, because the mounting member 220 serves also as a waterproof construction, no such waterproof seal is required. Consequently, a reduction in cost and an improvement in assemblability when manufacturing the battery-side electrical connector 200A are achieved.

Third Embodiment

Figure 12:
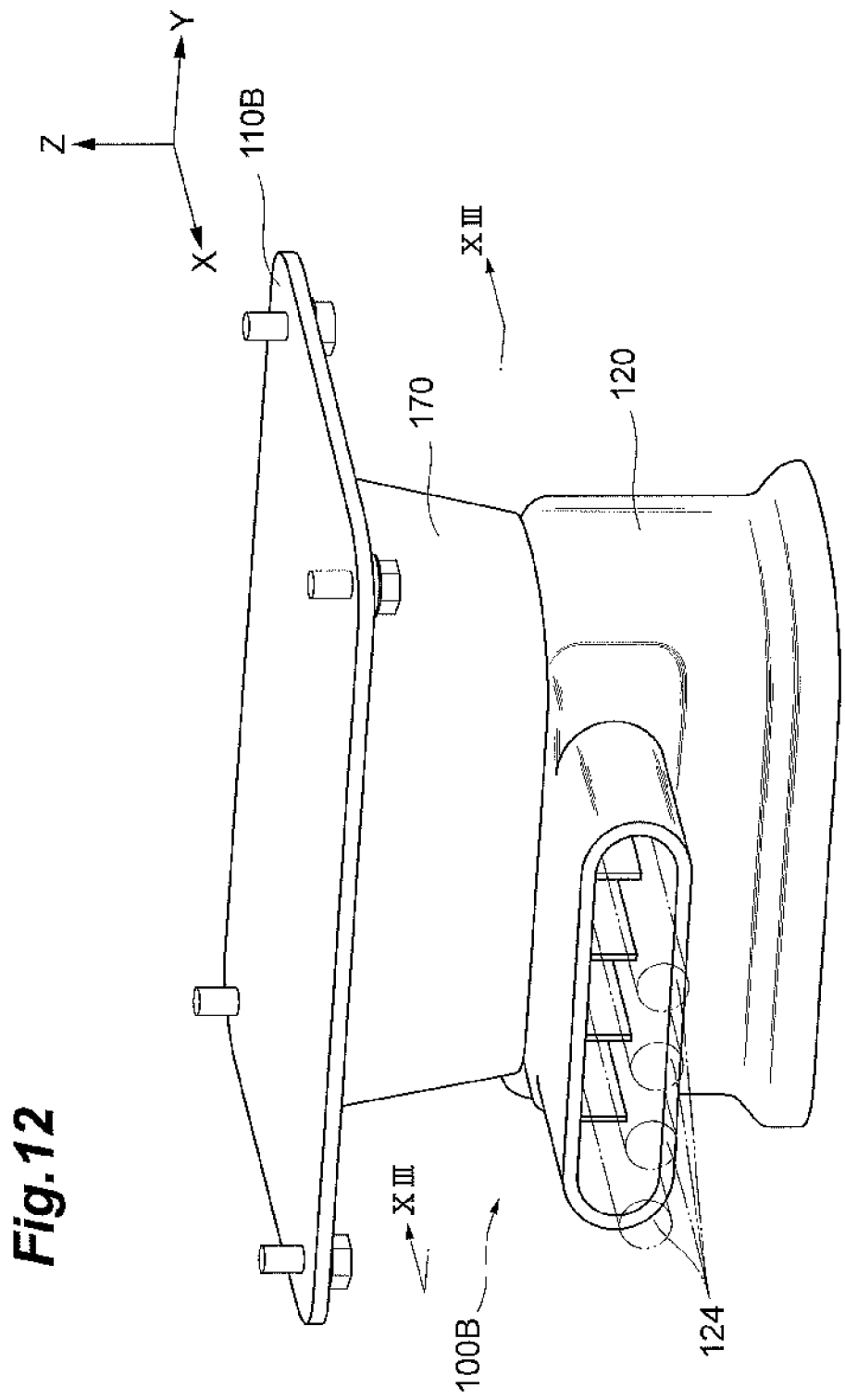
FIG. 12 is a perspective view showing a connector pair according to a third embodiment of the present invention.
Figure 13:
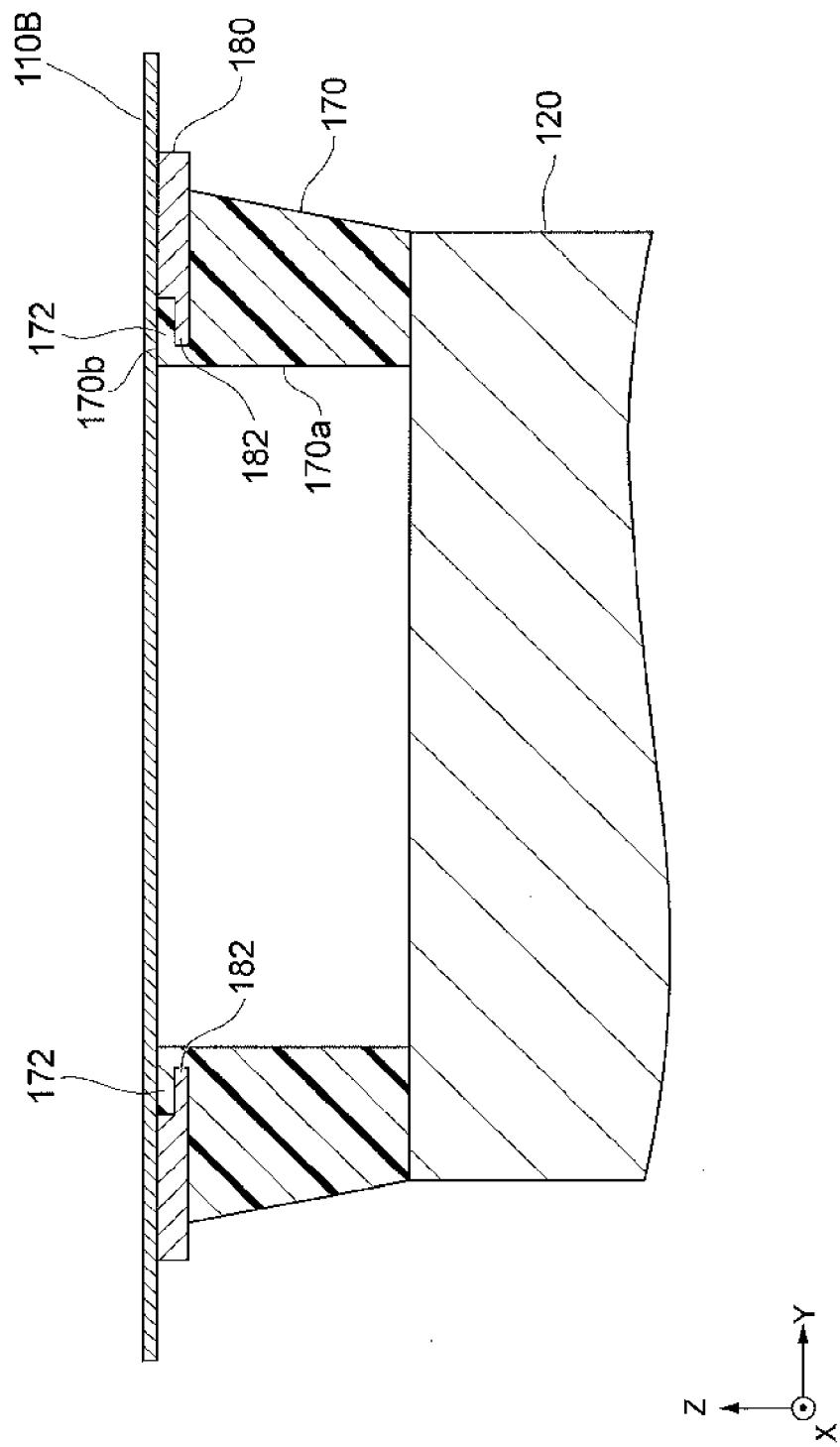
FIG. 13 is a sectional view taken along a line XIII-XIII of the connector pair shown in FIG. 12.

Next, a third embodiment of the present invention will be described while referring to FIG. 12 to FIG. 13. The third embodiment is different from the first embodiment described above in the structure of a vehicle-side electrical connector, and is the same in other aspects.

The vehicle-side electrical connector 100B according to the third embodiment is composed of a base bracket 110B, a vehicle-side connector (automotive equipment-side connector) 120, a mounting member 170, and a mounting attachment 180. The base bracket 110B is the same as the base bracket 110 of the first embodiment described above except for the point of not including a portion of a depression 112 and an opening portion 114. Moreover, the vehicle-side connector 120 is also the same as the vehicle-side connector of the first embodiment described above.

The mounting member 170 and the mounting attachment 180 of the third embodiment are members that are the same as the mounting member 220 and the mounting attachment 230 of the second embodiment.

Figure 14:
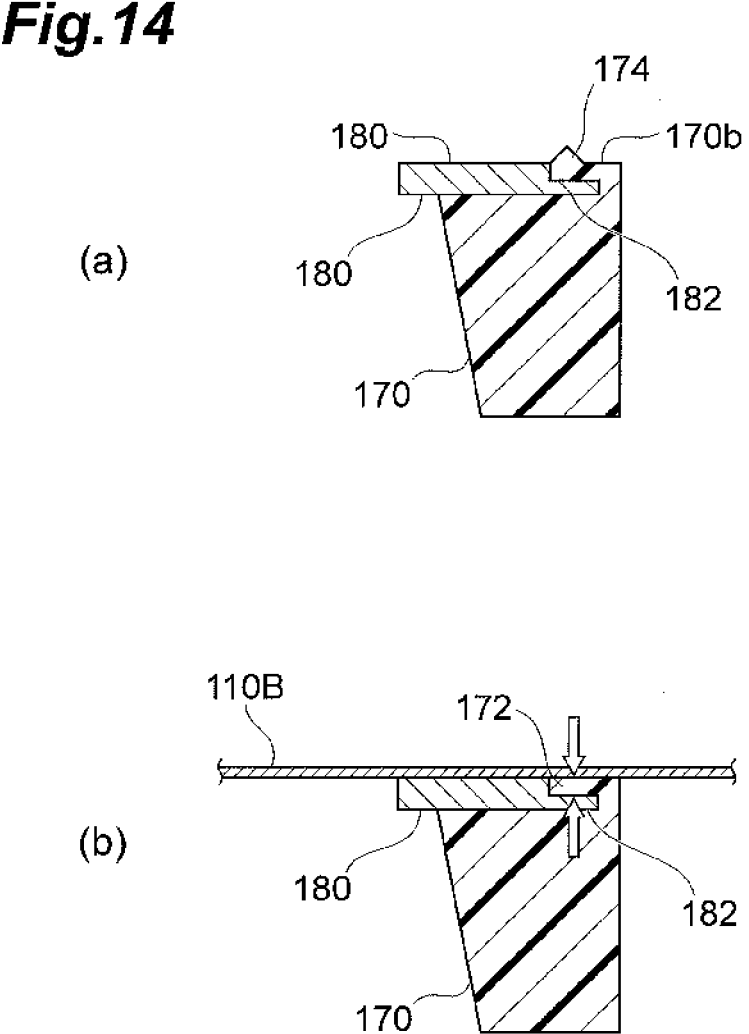
FIG. 14 includes views showing (a) a state of a mounting member before attachment and (b) a state of the mounting member after attachment.

That is, similar to the mounting member 220 of the second embodiment, the mounting member 170 is a member for causing the vehicle-side connector 120 to be mounted in a state spaced at a predetermined interval with respect to the base bracket 110B, and is formed of rubber being a soft material. The mounting member 170 is in a tubular shape extending in an opposing direction (Z-direction) between the vehicle-side connector 120 and the base bracket 110B, the external shape of an X-Y section of which is an elliptical shape having a long diameter direction in the Y-direction. The mounting member 170 is, at its lower end surface, bonded to the vehicle-side connector 120. Moreover, as shown in FIG. 14(a), on an upper end surface (that is, a surface opposed to the base bracket 110B) 170b of the mounting member 170, there is formed at a position corresponding to an eaves portion 182 of the mounting attachment 180 an annular protrusion portion 174 that is the same as the annular projection portion 224 of the second embodiment. Also, the mounting attachment 180 is bonded to the mounting member 170.

Because the annular projection portion 174 is projected from the upper end surface 170b of the mounting member 170 and an upper end surface 180b of the mounting attachment 180, when the upper end surface 180b of the mounting attachment 180 and a lower surface of the base bracket 110B are fitted together so as to be closely adhered, a part 172 sandwiched between the eaves portion 182 of the mounting attachment 180 and the base bracket 110B is pressed from the up and down directions to produce a high internal stress, and in the annular compressed part 172, there is improved adhesion at a joint surface between the mounting member 170 and the base bracket 110B.

The mounting member 220 is a member for causing the battery-side connector 210 to be mounted in a state spaced at a predetermined interval with respect to the base bracket 240, is formed of rubber being a soft material, and provides the same effects as those of the mounting members 130A, 130B described above. That is, according to the mounting member 220, for the base bracket 240 and the battery-side connector 210, a relative positional displacement in the compressing direction (Z-direction) as well as a relative positional displacement in a sliding direction (a direction in an X-Y plane) are permitted by elastic deformation of the mounting member.

Similar to the vehicle-side electrical connector 100, also in such a vehicle-side electrical connector 100B, even when there is a positional displacement and/or inclination between the vehicle-side electrical connector 100B and the battery-side electrical connector 200 and a relative positional displacement in the sliding direction has occurred, self-correction is performed by elastic deformation of the mounting member 170. Thus, according to the vehicle-side electrical connector 100B, coupling when coupling the battery-side electrical connector 200 can be easily performed.

Furthermore, similar to the annular compressed part 222 of the second embodiment, because high sealability in the inner hole 170a of the mounting member 170 is realized as a result of the adhesion at a contact surface between the mounting member 170 and the base bracket 110B being improved by the annular compressed part 172, entrance of water into the interior of a case of the vehicle-side electrical connector 100B can be effectively prevented. Consequently, a reduction in cost and an improvement in assemblability when manufacturing the vehicle-side electrical connector 100B are achieved.

Also, the present invention is not limited to the embodiments described above, and various modifications can be made. For example, the constituent material for a mounting member is not limited to rubber, and various elastic materials such as a silicon resin and urethane can be adopted. Moreover, the mounting member can also be installed on a side surface of a vehicle-side electrical connector, not on an upper surface. Further, the shape and number of restricting portions such as ribs can be appropriately changed, and preferably, a plurality of restricting portions are provided.

Moreover, the vehicle-side connector 120 and the base bracket 110 can also be disposed so that their longitudinal direction corresponds to the vehicle front-rear direction.

It can also be considered to apply the electrical connector of the embodiment described above to, for example, a component that performs electrical connection simultaneously with mounting a heavy-weight component, such as a component for connection with a motor and inverter, a pump-related component, or the like, and absorbs a positional displacement and vibration.

REFERENCE SIGNS LIST

10: Electric vehicle
20: Battery unit
100, 100A, 100B: Vehicle-side electrical connector
110, 110A, 110B: Base bracket
120: Vehicle-side connector
130A, 130B, 220, 170: Mounting member
140: Protrusion portion
142, 144: Rib
152: Flange portion
160: Stopper portion
174, 224: Annular projection portion
180, 230: Mounting attachment
182, 232: Eaves portion
200, 200A: Battery-side electrical connector

The invention claimed is:

1. A connector component including a connector that composes a connector pair on an automotive equipment side and a battery side for mounting a battery in an automobile, the connector component comprising:
   a base bracket to be fixed to a vehicle body or the battery; and
   a mounting member formed of an elastic material, for causing the connector to be mounted in a state spaced at a predetermined interval with respect to the base bracket, wherein
   the connector and the base bracket are integrally constructed via the mounting member,
   said connector component further comprising a mounting attachment for fixing the mounting member to the base bracket, wherein
   the mounting member is in a tubular shape extending in an opposing direction between the connector and the base bracket,
   the mounting attachment has an annular eaves portion embedded in the mounting member so as to surround an inner hole of the mounting member, and not to be brought into contact with the base bracket, and
   the mounting member has an annular projection portion formed at a position, of a surface opposed to the base bracket, corresponding to the annular eaves portion.

2. The connector component according to claim 1, wherein the mounting member is formed of rubber.

3. The connector component according to claim 2, wherein the base bracket is provided with an opening portion on which a stopper portion that projects from a front surface of the connector closer to the base bracket is locked in a penetrating manner, and
   by cooperation of the stopper portion of the connector with the opening portion of the base bracket, detachment of the connector from the base bracket is prevented.

4. The connector component according to claim 1, wherein the mounting member is bonded to the connector and the base bracket by vulcanization bonding.

5. The connector component according to claim 4, wherein the base bracket is provided with an opening portion on which a stopper portion that projects from a front surface of the connector closer to the base bracket is locked in a penetrating manner, and
   by cooperation of the stopper portion of the connector with the opening portion of the base bracket, detachment of the connector from the base bracket is prevented.

6. The connector component according to claim 1, wherein the base bracket is provided with an opening portion on which a stopper portion that projects from a front surface of the connector closer to the base bracket is locked in a penetrating manner, and
   by cooperation of the stopper portion of the connector with the opening portion of the base bracket, detachment of the connector from the base bracket is prevented.

7. The connector component according to claim 1, wherein,
   on one front surface out of a front surface of the base bracket closer to the connector and a front surface of the connector closer to the base bracket, a restricting portion that projects toward the other front surface, and restricts inclination of the base bracket and the connector by being brought into contact with the other front surface is provided.

8. The connector component according to claim 1, being an automotive equipment-side connector component.

9. The connector component according to claim 1, being a battery-side connector component.

* * * * *